United States Patent [19]
Forget

[11] Patent Number: 6,076,688
[45] Date of Patent: *Jun. 20, 2000

[54] HOT FILLABLE PLASTIC BOTTLE NECK DESIGN

[76] Inventor: Gerald L. Forget, 2 Des Plaines, Mercier, Quebec, Canada, J6R 1X7

[*] Notice: Under 35 U.S.C. 154(b), the term of this patent shall be extended for 136 days.

[21] Appl. No.: 08/693,641

[22] Filed: Aug. 9, 1996

[51] Int. Cl.[7] .............................. B65D 1/02; B29C 49/06
[52] U.S. Cl. ............................................. 215/44; 264/537
[58] Field of Search ................................. 215/40, 44, 47; 220/425; 264/537, 539; 425/525

[56] References Cited

U.S. PATENT DOCUMENTS

| | | | |
|---|---|---|---|
| 1,423,560 | 7/1922 | Hall ............................................. | 215/40 |
| 3,907,144 | 9/1975 | Winkler ................................. | 215/44 X |
| 4,362,250 | 12/1982 | Cottingham ........................... | 215/40 X |
| 4,724,116 | 2/1988 | Aoki ......................................... | 264/537 |
| 5,035,931 | 7/1991 | Yamada et al. . | |
| 5,447,766 | 9/1995 | Orimoto et al. . | |
| 5,472,105 | 12/1995 | Krishnakumar et al. . | |

FOREIGN PATENT DOCUMENTS 402258543  10/1990  Japan ....................................... 215/44

*Primary Examiner*—Stephen K. Cronin
*Assistant Examiner*—Nathan Newhouse
*Attorney, Agent, or Firm*—Eric Fincham

[57] ABSTRACT

A hot fillable plastic container having a body with a neck surrounding a dispensing aperture, the neck having an inner wall and an outer wall spaced therefrom to thereby provide a gap between the inner wall and outer wall which functions as a thermal insulation means. The neck is thus able to better withstand the temperatures encountered during the filling operation without deformation.

7 Claims, 3 Drawing Sheets

HOT FILLABLE PLASTIC BOTTLE NECK DESIGN

BACKGROUND OF THE INVENTION

The present invention relates to hot fillable plastic containers and more particularly, relates to an improved neck structure for hot fillable plastic containers.

SUMMARY OF THE INVENTION

The use of hot fillable plastic containers for various products is well known in the art and is gaining an increased acceptance. These containers are designed to receive liquids which must be sterilized and placed in the container while hot. Typically, these containers are filled while the liquid is in the temperature range of 175° F.–185° F.

In the art, hot fillable polyester bottles are produced by a stretch blow molding technology which begins with the formation of an injected molded preform. The preform is typically of a configuration similar to that of a laboratory test tube in that it has an elongated cylindrical configuration with an open end. The open end (which will form the filling and pouring aperture of the container) is injected molded to have the final configuration of the container open end. In other words, this portion is formed during the injection molding process and is not changed during the subsequent blow molding operation. It will typically have means such as external threads to accept a closure thereon.

Subsequently, the preform body is heated to a suitable temperature although the neck area is not heated. After reaching the desired temperature, the preform is introduced into a controlled temperature blow mold. This mold is designed to give the final configuration to the body of the container.

Once located in the blow mold, a rod is introduced into the preform to stretch the preform to the bottom or base of the blow mold. High pressure air is then introduced into the preform and forces the plastic material of the preform into contact with the blow mold. The plastic cools sufficiently such that when the blow mold opens, the newly formed structure retains its shape.

The body of the container, having been biaxially oriented through the axial stretching followed by radial stretching undergoes a molecular change which transforms the morphous structure of the preform into a semi-crystalline container wall. This transformation allows the container walls to withstand relatively high temperatures such as encountered during the filling of the container with the hot product.

While the body is capable of withstanding the temperatures of the hot product during the filling, the neck of the container has not undergone any molecular change and remains in an amorphous state. As such, the plastic will soften at its glass transition temperature which varies according to the plastic, but is well below the temperatures typically encountered during hot filling.

In order to overcome the above problem, the neck portion is usually formed to have a relatively large thickness which increases the amount of time available before the heat from the hot fill product migrates into the thread area which can cause distortion. Even with increased thickness, the amount of time is relatively short and intensive water cooling of the exterior of the container neck is necessary immediately after capping in order to minimize the thread distortion.

As will be appreciated, a slight increase in process fill temperature or an interruption of the filling line can easily upset the balance and allow enough heat migration into the thread area such that failure of the neck will occur.

It is an object of the present invention to provide a neck for a hot fillable plastic container, and which net has an exterior surface which is resistant to distortion from hot filled product.

It is a further object of the present invention to provide a hot fillable plastic container having a neck with an outer surface which is resistant to deformation from hot filled product and which neck may easily be formed without any additional steps in the manufacturing process.

According to one aspect of the present invention, there is provided a hot fillable plastic container having a body and a neck, the neck surrounding a dispensing aperture, the neck having an inner neck wall and an outer neck wall, the inner neck wall and outer neck wall being spaced apart to provide a gap therebetween, the outer neck wall having means thereon adapted to engage a closure member.

In a further aspect of the present invention, there is provided a method of forming a hot fillable plastic container, the method including the steps of injection molding a preform to have an inner neck wall and an outer neck wall, the inner neck wall and outer neck wall being spaced apart to provide a gap therebetween, and subsequently blow molding a body portion thereof to form the container.

In greater detail, the hot fillable plastic container of the present invention may be formed of any number of known polymeric materials which have the required physical characteristics such as strength and resistance to the elevated temperatures. Many such materials are known including different polyesters, polycarbonates, polyolefins, etc. A well known and preferred material in the art is biaxially oriented polyethylene terephthalate (PET). Other polymers which have gained some acceptance include polyethylene naphthalate (PEN). Obviously, various copolymers may be utilized and the container could be formed in a single layer or a multi-layer structure.

The body portion of the container may be any desired and a number of different structures have been proposed in the art to receive hot fill product. Various proposals have been advanced regarding different panel sections which reduce the magnitude of problems created by a vacuum when the product cools.

The neck area will have an exterior surface having means to receive a closure. Conventionally, these closures comprise a cap which is screw threadedly engaged with the exterior of the container neck although other types of closures known in the art may be utilized.

According to the present invention, the neck area is provided with an inner wall and an outer wall, with the inner wall and outer wall being spaced from each other. In between the walls is a gap which conveniently may be filled with air such that there is an air space insulation between the inner wall and outer wall.

Once the container has been filled with a hot product and capped, a seal is formed between the inner wall and cap to prevent any of the product from entering the space between the inner wall and outer wall. The presence of the air space acts as an insulating barrier and minimizes the problem of heat migration into the outer wall which has the threads formed thereon.

BRIEF DESCRIPTION OF THE DRAWINGS

Having thus generally described the invention, reference will be made to the accompanying drawings illustrating an embodiment thereof, in which.

DESCRIPTION OF THE PREFERRED EMBODIMENTS

Figure 1:
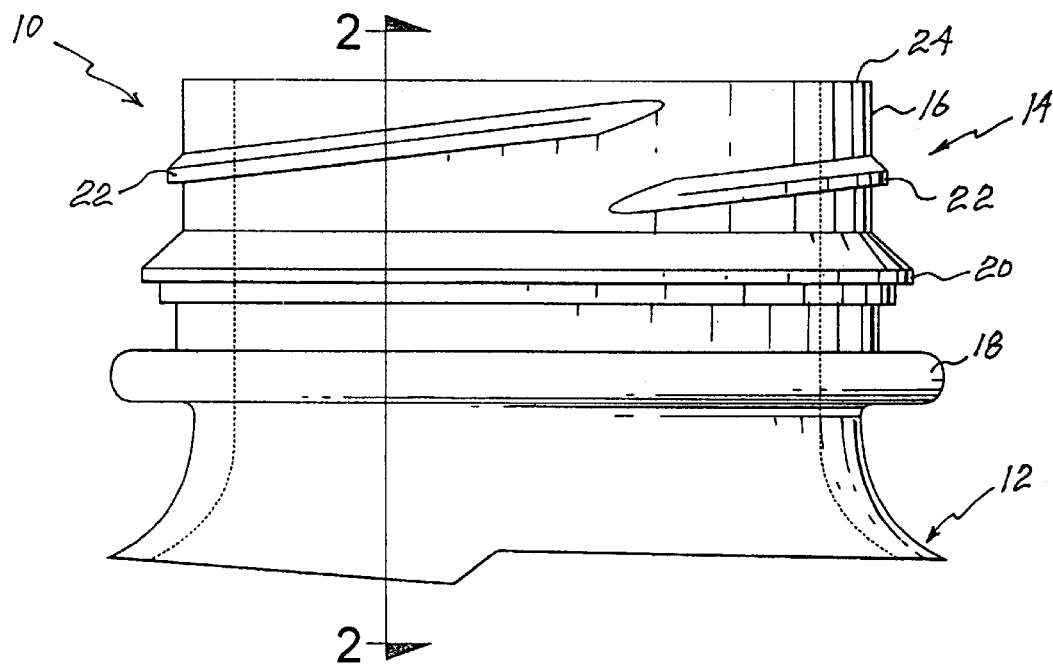
FIG. 1 is a side elevational view of a neck finish of a conventional hot fill container.
Figure 2:
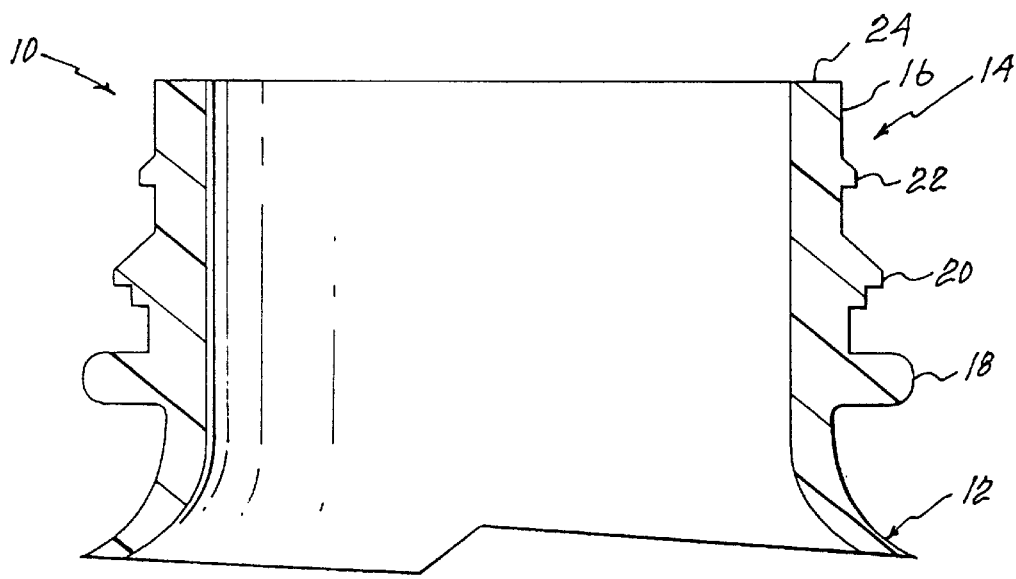
FIG. 2 is a cross sectional view taken along the lines 2—2 of FIG. 1.

Referring to the drawings in greater detail and by reference characters thereto, there is illustrated in FIGS. 1 and 2 a conventional hot fill container which is generally designated by reference numeral 10. Hot fill container 10 includes a body portion 12 and a neck portion 14. Neck portion 14 has an outer surface 16 from which extends an annular bottom flange 18 and an annular upper flange 20. Neck 14 includes a neck wall upper surface 24 and a thread 22 is provided on outer surface 16 between neck wall upper surface 24 and upper flange 20. Thread 22 is adapted to screw threadedly engage with a conventional closure (not shown).

Figure 3:
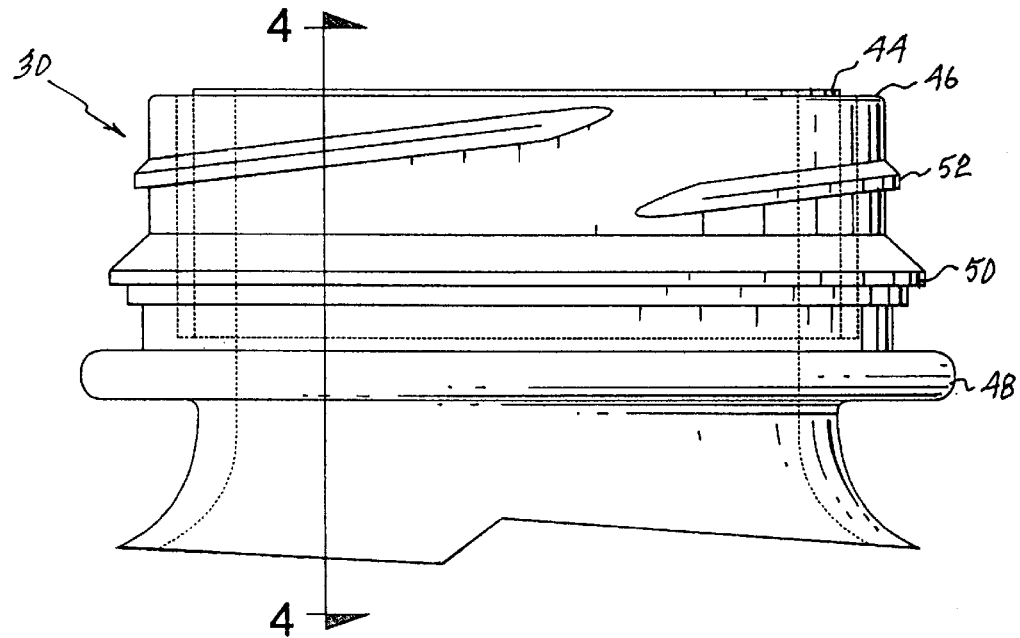
FIG. 3 is a view similar to FIG. 2 illustrating a neck finish of a container according to the present invention.
Figure 4:
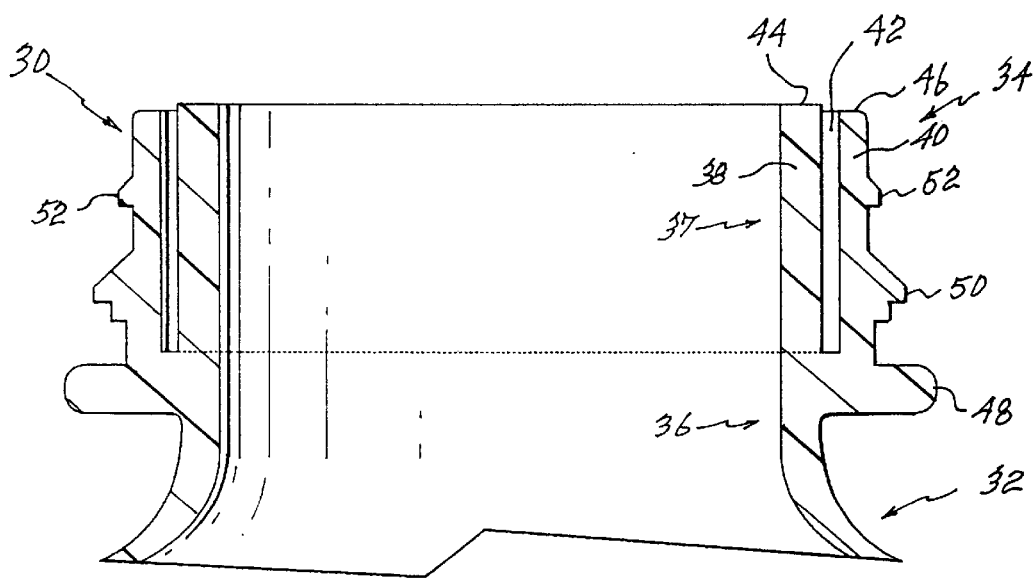
FIG. 4 is a cross sectional view taken along the lines 4—4 of FIG. 3.
Figure 5:
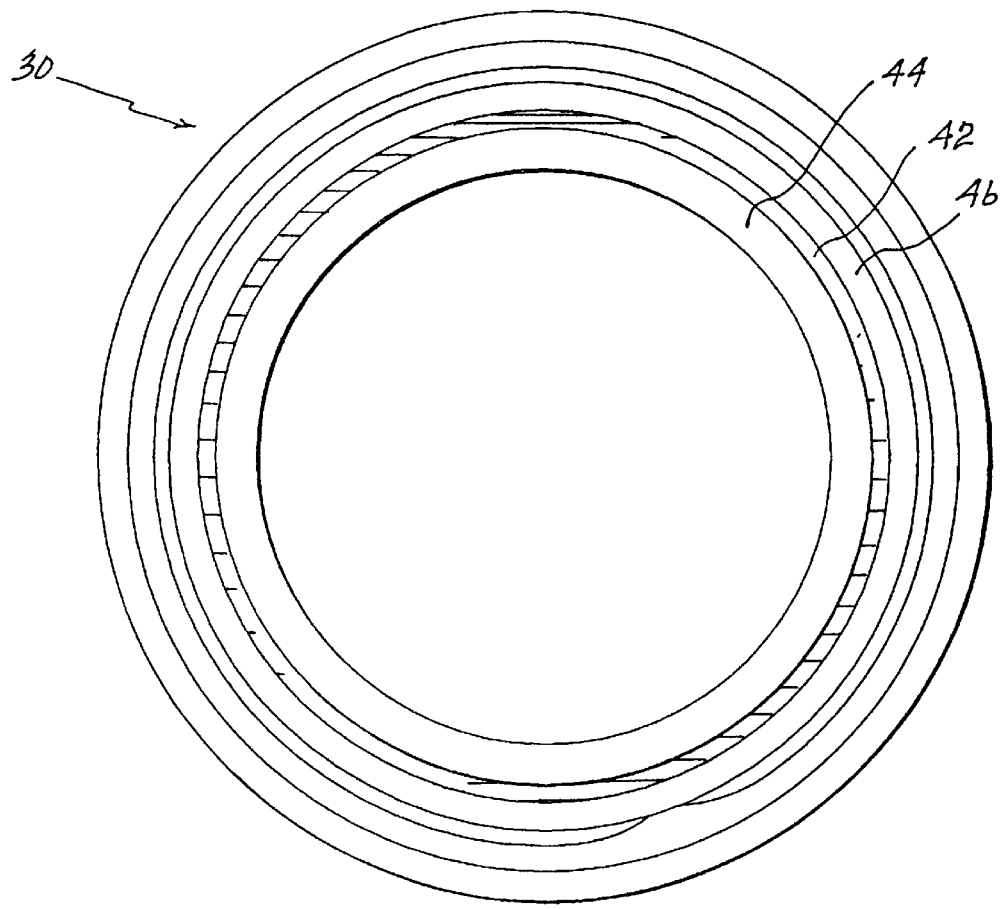
FIG. 5 is a top elevational view of the embodiment of FIGS. 2 and 4.

Referring to the embodiment of FIGS. 3 to 5, there is provided a hot fillable container generally designated by reference numeral 30 and which includes a conventional body portion 32 and a neck portion generally designated by reference numeral 34.

Neck portion 34 includes a lower neck wall 36 with an upper neck wall portion generally designated by reference numeral 37.

Upper neck wall portion 37 is comprised of an inner neck wall 38 and an outer neck wall 40 having an air gap 42 therebetween.

As may be best seen in FIGS. 4 and 5, inner neck wall 38 terminates to have an inner wall upper surface 44 while outer neck wall 40 terminates to have an outer wall upper surface 46; inner wall upper surface 44 and outer wall upper surface 46 terminate in substantially the same plane.

Provided on the outer surface of outer neck wall 40, in a manner similar to a conventional neck, is a bottom flange 48 and an upper flange 52 with a thread 52 being formed on the outer surface of outer wall 46 between upper flange 50 and outer wall upper surface 46.

As will be understood by those knowledgeable in the art, the formation of an inner neck wall 38, outer neck wall 40 having an air gap 42 therebetween is relatively easy during the injection of the preform.

Once the container has been filled with the hot product and capped, a seal is formed between the inner wall and cap thus preventing any of the product from entering the insulating air gap 42. Similarly, the seal between the outer wall upper surface 46 and the cap will prevent any material from entering air gap 42 (such as water from a cooling spray used to cool the filled container). The heat is prevented from migrating into the outer neck wall 40 having threads 52 thereon by means of insulating air gap 42. One can thus use both a hotter fill temperature and have an increased tolerance to filling line stoppages.

It will be understood that the above described embodiment is for purposes of illustration only and that changes and modifications may be made thereto without departing from the spirit and scope of the invention.

I claim:

1. A hot fillable container having a body and a neck, said container being formed of a blow moldable polymeric material, said neck surrounding a dispensing aperture, said neck having an inner neck wall and an outer neck wall, said inner neck wall and said outer neck wall being spaced apart to provide a gap therebetween, said outer neck wall having means thereon adapted to engage with a closure member.

2. The container of claim 1 wherein said outer neck wall has threads thereon adapted to engage threads on a closure member.

3. The container of claim 1 wherein said gap between said inner neck wall and said outer neck wall has a cylindrical configuration, said gap communicating with the exterior at a top surface of said neck.

4. The container of claim 1 wherein said container is formed of polyethylene naphthalate.

5. The container of claim 4 wherein said plastic container is formed of a polyethylene terephthalate material.

6. The container of claim 3 wherein said outer neck wall has threads thereon adapted to engage threads on a closure member, and wherein said gap between said inner neck wall and said outer neck wall is of a substantially continuous cylindrical configuration, said gap communicating with the exterior at a top surface of said neck.

7. A method of forming a hot fillable plastic container to minimize heat distortion in a neck portion of the container, the method comprising the steps of injection molding a preform, said preform having a cylindrical body portion and a neck portion of substantially the same diameters, forming said neck to have an inner neck wall and an outer neck wall, said inner neck wall and said outer neck wall is spaced apart to provide a gap therebetween, and subsequently blow molding said body portion to have a desired configuration.

* * * * *